United States Patent [19]
Czaplicki et al.

[11] Patent Number: 5,985,435
[45] Date of Patent: Nov. 16, 1999

[54] MAGNETIZED HOT MELT ADHESIVE ARTICLES

[75] Inventors: Michael Czaplicki, Rochester; Thomas Coon, Lapeer; Thomas Stebbins, St. Clair Shores, all of Mich.

[73] Assignee: L & L Products, Inc., Romeo, Mich.

[21] Appl. No.: 08/590,009

[22] Filed: Jan. 23, 1996

[51] Int. Cl.⁶ ........................................ B32B 5/16
[52] U.S. Cl. .................. 428/323; 428/195; 428/204; 428/356; 428/411.1; 428/688; 428/689; 428/692; 428/900; 264/174.11; 156/244.17; 156/244.25; 156/306.6
[58] Field of Search ............... 156/306.6, 244.17, 156/327, 244.25; 428/195, 411.1, 204, 688, 689, 692, 323, 900, 356; 204/174.11

[56] References Cited

U.S. PATENT DOCUMENTS

| | | | |
|---|---|---|---|
| 4,427,481 | 1/1984 | Smith et al. | 156/306.6 |
| 4,693,775 | 9/1987 | Harrison et al. | 156/272.4 |
| 4,724,243 | 2/1988 | Harrison | 523/400 |
| 4,749,434 | 6/1988 | Harrison | 156/306.9 |
| 4,769,166 | 9/1988 | Harrison | 252/62.54 |

*Primary Examiner*—Timothy Speer
*Assistant Examiner*—Abraham Bahta
*Attorney, Agent, or Firm*—Dykema Gossett PLLC

[57] ABSTRACT

A reinforced magnetic hot patch has an attached rigid backing. The hot patch expands and flows when heated to seal an opening in a structural member. A non-planar magnetic hot patch is also provided.

21 Claims, 2 Drawing Sheets

5,985,435

MAGNETIZED HOT MELT ADHESIVE ARTICLES

FIELD OF THE INVENTION

The present invention relates generally to magnetized adhesives and, more specifically, provides magnetized articles formed from hot melt adhesives.

BACKGROUND OF THE INVENTION

In the automotive industry it is often necessary to seal gaps and joints in metal structures using an adhesive plug or patch. For example, where a stamping and a structural beam meet a longitudinal gap may arise. In addition, drainage holes, assembly access holes, fastening holes, tooling holes, weld access holes and the like are often formed in automobile body structures and must be subsequently closed. As will be appreciated by those skilled in the art, if left unsealed these gaps and holes allow dust and fumes to enter the passenger compartment and create a source for water leakage and corrosion.

A number of devices have been used in the past to seal gaps and holes in automotive bodies. Assemblies of hot melt adhesives have been clipped into place on the unsealed hole such that the adhesive melts as the vehicle passes through a paint oven. Resilient rubber plugs have been forced by hand into access holes to create a seal. Both of theses techniques, however, usually require the use of considerable mechanical force by the assembly technician which is undesirable. Moreover, if improperly placed these devices may become loose or even dislodge during movement of the vehicle down the assembly line. Also, metal clips in contact with the vehicle body may create a source of metal corrosion (owing to galvanic corrosive activity).

In order to facilitate the closure of longitudinal gaps between parts, hot melt adhesive tapes were developed which could be rolled out to the desired length and placed over the gap. In many instances there was sufficient tack to the tape to hold it in place until the vehicle passed through an oven whereupon the adhesive melted and flowed into the gap, effectively forming a seal. In some applications, however, a technique was needed to hold the tape in position until the adhesive could be melted.

In response to this need for a method of retaining the tape in position (for example where the gap to be sealed faced downwardly), a self-adhering magnetic tape was developed. These prior art magnetized hot melt adhesive tapes comprise long, thin ribbons of thermoset or thermoplastic resins admixed with magnetizable particles. More specifically, many of these prior art magnetic tapes are formed by blending a thermoplastic resin, various elastomers and tackifiers, and magnetizable particles such as barium ferrite to form an extrudable polymer mixture. The mixture is then extruded to form a relatively thin, planar ribbon or tape. After the tape has cooled the ferrite particles are magnetized by passing the tape through a magnetizer.

In use, these prior art magnetic tapes are placed on the ferrometallic parts along the gap. The magnetic field generated by the magnetized particles is sufficient to temporarily bond the tape to the adjacent metal. As the resin components of the tape begin to melt, it is claimed that there is sufficient magnetic force to draw the tape into the gap to form a complete seal. Following the melt phase, the magnetic tape is usually at least partially demagnetized, but the adhesive properties of the tape continue to form a strong bond with the metal surfaces.

Prior art magnetic tapes are exemplified in a number of prior art patents. For example U.S. Pat. No. 4,427,481 discloses a magnetic hot melt adhesive which is extruded to form a tape. It is stated therein that the extrusion die can be altered to produce a magnetized adhesive of triangular or circular cross-section. U.S. Pat. No. 4,769,166 describes an expandable magnetic sealant which is first formed as a tape and is then cut to a desired length or shape. U.S. Pat. Nos. 4,724,243 and 4,749,434 similarly disclose hot melt magnetic sealants.

While these prior art tapes are useful in many applications, the geometry of tapes, cylinders and triangles are often incompatible with the space to be sealed. This lack of conformity in the geometries of the magnetic adhesive and the hole or gap may result in only partial closure of the space or insufficient contact between the magnetized body and the ferrometallic structure. As a result the initial adhesive and magnetic bond may not hold the tape in place. It will be appreciated by those skilled in the art that if a hot melt adhesive patch is dislodged and then melts at an arbitrary position in the vehicle, in many instances it must be subsequently removed. Therefore, it would be desirable to provide a hot melt patch adhesive which is well secured to the metallic surface prior to the melt phase of the process.

In addition, in some applications the hot melt adhesive does not provide sufficient strength at the sealed gap. For example the present inventor has found that conventional hot melt patches rupture under relatively modest loads. Therefore, it would be desirable to provide a hot melt patch which has high physical strength to resist rupture.

SUMMARY OF THE INVENTION

In one aspect the present invention provides a reinforced magnetic hot melt patch for use in sealing an opening in a motor vehicle body or other structure. The reinforced magnetic hot melt patch has a rigid plastic or metal backing which is adhesively bonded to a magnetized hot melt adhesive body. In one aspect the reinforced magnetic hot melt patch has a non-planar geometry and has surfaces that mate with surfaces surrounding the opening to be sealed.

In another aspect the present invention provides a magnetic hot melt patch which has a non-planar geometry that is configured to mate specifically with the opening to be sealed.

In still another aspect the present invention provides a method of sealing a hole in an automotive vehicle body or other structure which includes the steps of determining the shape of the hole to be sealed, preparing a magnetic hot melt patch having a shape which corresponds to the shape of the metal surrounding the hole, placing the patch on the metal so that the patch and the metal engage for maximum magnetic surface contact, and heating the automotive body or other structure and the patch to melt the adhesive, forming an adhesive bond sealing the hole.

BRIEF DESCRIPTION OF THE PREFERRED EMBODIMENTS OF THE INVENTION

Figure 1:
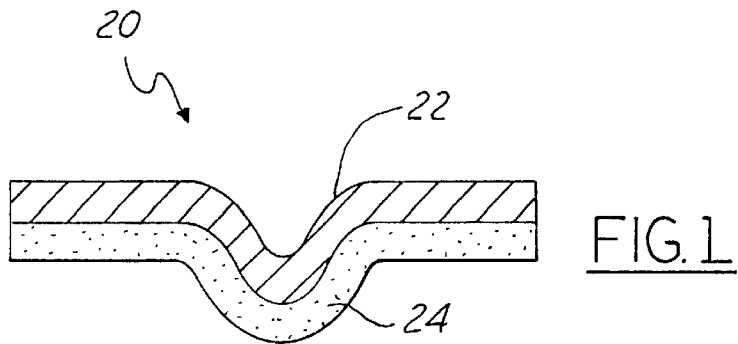
FIG. 1 is an elevational cross-section of the reinforced magnetic hot patch article of the present invention in one embodiment (not to scale).

Referring now to FIG. 1 of the drawings, in one preferred embodiment, the present invention provides a hot melt magnetic patch assembly 20 shown having rigid non-planar backing 22 to which conforming non-planar adhesive layer 24 is attached. Rigid non-planar backing 22 is preferably formed of metal, such as aluminum or steel, although other materials such as plastic may be suitable in some applications. Thus, as will be more fully explained hereinafter, in the most preferred embodiment, rigid non-planar backing 22 is shaped using conventional metal forming techniques such as through the use of a progressive die. In most instances, non-planar backing 22 will have a thickness of between about 0.05 mm and 1.0 mm if it is formed of aluminum and between about 0.5 mm and 5.0 mm if it is formed of plastic. The area of non-planar backing 22 will be dictated by the area of the opening to be sealed. As used herein, "non-planar" means a geometry other than a flat sheet such as the metal blanks utilized in the present invention prior to the metal forming step.

Adhesive 24 is a synthetic polymer which incorporates magnetizable particles. Adhesive 24 (1) provides a strong magnetic field; (2) melts at temperatures encountered in automotive paint ovens (between about 100 and 235° C.) in order to flow over and around the opening to be sealed; (3) bonds well to metal; and (4) partially expands to fill the opening. Most preferably, adhesive 24 is a hot melt magnetic sealant.

More specifically, adhesive 24 includes as one component a synthetic polymer resin or a blend of resins and preferably includes one or more elastomers. Preferred thermoplastic resins useful in the present invention are polyolefins, preferably copolymers and terpolymers containing ethylene, for example, ethylene vinyl acetate copolymers, ethylene ethyl acrylate, ethylene-vinyl acetate-glycidal methacrylate, ethylene acrylate-maleic anhydride, and ethylene-propylene copolymers. Also, certain block copolymers such as an styrene-butadiene block copolymer may be suitable. Copolymers and terpolymers containing polyvinyl chloride are also preferred for use herein. Preferred thermosetting resins for use in the present invention are epoxies, acrylates, and polyurethanes and combinations thereof.

In one preferred embodiment, adhesive 24 contains a polyolefin resin, preferably a combination of ethylene vinyl acetate copolymer (EVA) and one or more acrylic resins, such as ethylene methyl acrylate, ethylene ethyl acrylate and ethylene butyl acrylate. The preferred EVA has from about 9 to about 40 percent by weight vinyl acetate and the preferred ethylene methyl acrylate, ethylene ethyl acrylate and ethylene butyl acrylate have from about 20 to about 40% methyl acrylate, ethyl acrylate or butyl acrylate, respectively.

A synthetic polymer comprises from about 10 to about 40 percent by weight (all percentages recited herein are percent by weight unless otherwise specified), and more preferably from about 15 to about 25 percent by weight of adhesive 24. Where EVA and acrylics are used as the base resin, EVA comprises about 2 to 20 percent by weight and an acrylic resin comprises about 10 to about 30 percent by weight of adhesive 24.

A cross-linking or curing agent is also preferably included in adhesive 24 to cross-link the polyolefin. Preferred cross-linking agents should provide a reasonable shelf life, but should also be fully activated at the temperatures encountered in the curing environment such as automotive paint ovens. Suitable curing agents useful in the present invention are peroxy compounds such as 1,1-bis(t-butylperoxy)-3,3, 5-trimethylcyclohexane and n-butyl-4,4-bis(t-butylperoxyl) valerate and particularly preferred are Varox 130XL, Varox 230XL and Varox 231XL sold by R.T. Vanderbilt Company.

A cross-linking agent comprises from 0.01 to about 2.5 percent by weight to about 0.1 to about 1.5 percent by weight of adhesive 24.

In a number of applications, a tackifier component is also included in the present invention to provide adhesion and to enhance peel strength. A number of tackifiers suitable for use herein will be known by those skilled in the art. Preferred are partially aromatic hydrocarbons such as "Escorez 2393" and "Staytac 100." The tackifier should have a number average molecular weight of from about 1,000–3,000, although values outside these ranges may be acceptable. Most preferred is Super Nevtac 99 available from the Neville Chemical Company. The tackifier component of adhesive 24 comprises from about 0 to about 20 percent, and more preferably from about 2.5 to about 10 percent by weight of the adhesive.

Adhesive 24 further includes magnetic particles which provide the magnetic field that retains assembly 20 in position on a ferrous metal substrate, as will be more fully explained herein. Preferred magnetizable particles for use in the present invention are ferrites, such as barium ferrite and strontium ferrite. Also preferred are iron oxides. One particularly preferred type of magnetic particles for use in the present invention is sold by Hoosier Magnetics, Inc., as HM206 "Starmag" ceramic powder. It is to be understood that virtually any magnetizable particles can be used in the present invention. The particle size of the magnetic particles is preferably between about 0.5 and 50 microns in diameter and more preferably from about 1 to about 10 microns, with the average magnetized particle size being preferably from about 2 to about 5 microns. Magnetizable particles comprise from about 50 to about 85 percent by weight of adhesive 24 and more preferably from about 65 to about 75 percent.

In the most preferred embodiment, adhesive 24 further includes a multifunctional cross-linking monomer such as trimethylolpropane trimethacrylate or trimethylolpropane triacrylate to increase the cross-linking density of adhesive 24. A multifunctional cross-linking monomer comprises from about 0.0 to about 2 percent by weight and more preferably from about 0.05 to about 0.5 percent by weight of adhesive 24.

It has been discovered that the use of an agent which produces expansion of adhesive 24 when it is melted in the automotive paint oven or the like, provides a more uniform and reliable seal of access holes and gaps. Expansion may not be needed in all applications but will be beneficial in many applications. Accordingly, in the preferred embodiment of the invention, adhesive 24 includes a blowing agent, preferably one which is thermally-activated, such as azodicarbonamide, para, para-oxybis (benzenesulfonylhydrazide) and para-toluene sulfonyl semicarbazide. Most preferred are Celogen 0T and Celogen AZ to produce a volumetric expansion of adhesive 24 of from about 25% to about 200% by volume. The preferred blowing agent is fully activated at about 100 to about 150° C. A blowing agent forms from about 0.01 to about 2.0 percent by weight and more preferably from about 0.1 to about 1.0 percent by weight of adhesive 24. A blowing agent promoter such as a surface-coated urea, for example BIK 0T (Naugatuck Chemicals) is also preferably included in a concentration of from about 0.05 to about 1.0 percent by weight of adhesive 24.

Adhesive 24, in the final article, should have a melt index that allows it to flow sufficiently during the sealing operation.

The following table sets forth the preferred generic components and concentration used in the formulation of the present invention with a listing of most preferred materials:

TABLE I

| Material | Approximate Range % | |
|---|---|---|
| | Preferred | Most Preferred |
| Magnetic particles (Hoosier Hm-206) | 50 to 85 | 65 to 75 |
| Ethylene Copolymer (Elvax 265) | 0 to 40 | 2 to 20 |
| Tackifier (Super Nevtac 99) | 0 to 20 | 2.5 to 10 |
| Acrylic Resins (Lotryl 35BA40 - Lotryl 28MA175) | 0 to 40 | 10 to 30 |
| Multifunctional Cross-Linking Monomer (SR350) | 0 to 2 | 0.05 to 0.5 |
| Cross-Linking Agent (Varox) 231XL | 0.01 to 2.5 | 0.1 to 1.5 |
| Blowing Agent (Celogen OT) | 0.01 to 2.0 | 0.1 to 1.0 |
| Blowing Agent Promoter (BIK) OT | 0.01 to 2.0 | 0.05 to 1.0 |
| Antimicrobial Plasticizer Agent (Sanitizer 711) | 0.05 to 5.0 | 0.1 to 2.0 |

A number of additives may also be included in adhesive 24 such as antioxidants, antiozonants, ultraviolet absorbers, antistatic agents, colorants, coupling agents, curing agents, flame retardants, blowing agents, heat stabilizers, impact modifiers, lubricants, plasticizers, preservatives, processing aids and stabilizers and combinations thereof.

Figure 2:
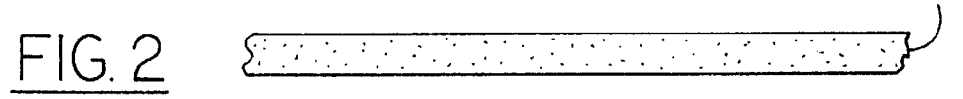
FIG. 2 illustrates a preform adhesive tape utilized in the present invention.

Adhesive 24 is prepared using conventional batch processing techniques which will be familiar to those skilled in the art. Briefly, the raw materials are added to a mixer and mixed until fully blended. Referring to FIG. 2 of the drawings a planar strip or tape 28 is then preferably formed by extruding the adhesive into the form of a sheet which may then be die cut to a specific shape. The sheet should have a thickness of from about 0.5 to about 5.0 mm.

At this stage, or after the sheet is cut to shape, the magnetizable particles are magnetized. A number of magnetizers are available for this purpose. Most preferred is a capacitive discharge magnetizer which provides large magnetic field densities. Although capacitive discharge is a discontinuous process, by properly spacing the discharge intervals, a sheet can be fully magnetized as it moves along a conveyor. Permanent magnetic magnetizers may also be used effectively. Adhesive 24 should generate a magnetic field density of at least about 50 gauss to be effective.

Figure 3:
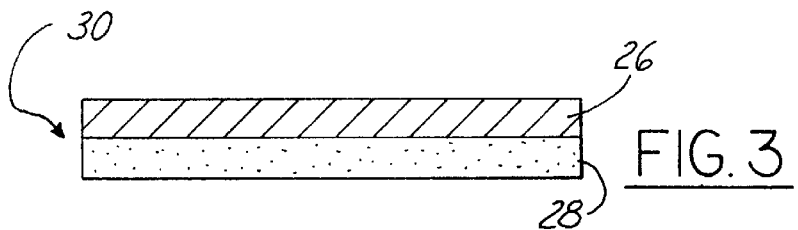
FIG. 3 is a cross-sectional view of an intermediate structure of the present invention prior to a forming operation.

Referring now to FIG. 3 of the drawings, assembly 20 is preferably fabricated using planar metal blank 26 which is adhesively bonded to planar magnetic adhesive strip 28 to form preform 30. This is achieved by placing strip 28 on blank 26 and then heating at about 80° C. to about 100° C. for about 15 seconds to about 2 minutes to form laminate structure 30. It is important that a strong bond be formed between strip 28 and blank 26 to ensure that structure 30 does not delaminate during the forming step.

Figure 4:
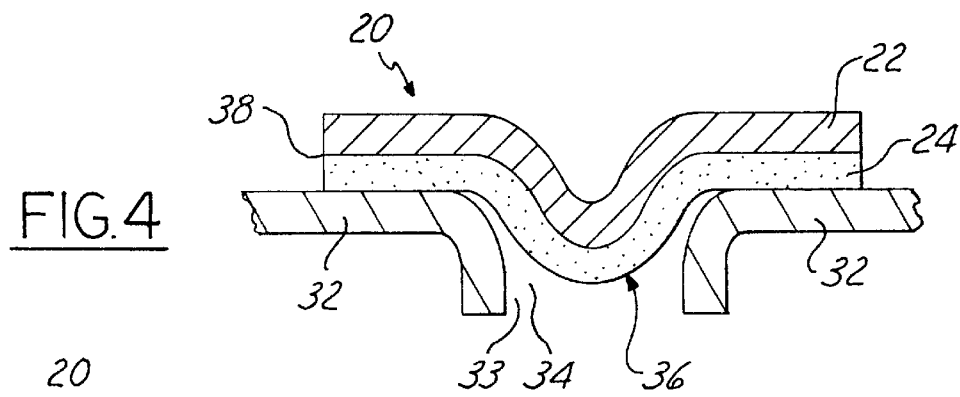
FIG. 4 illustrates in cross section the reinforced magnetic hot patch assembly of the present invention positioned on an opening to be sealed, but prior to expansion and melting of the adhesive layer.
Figure 5:
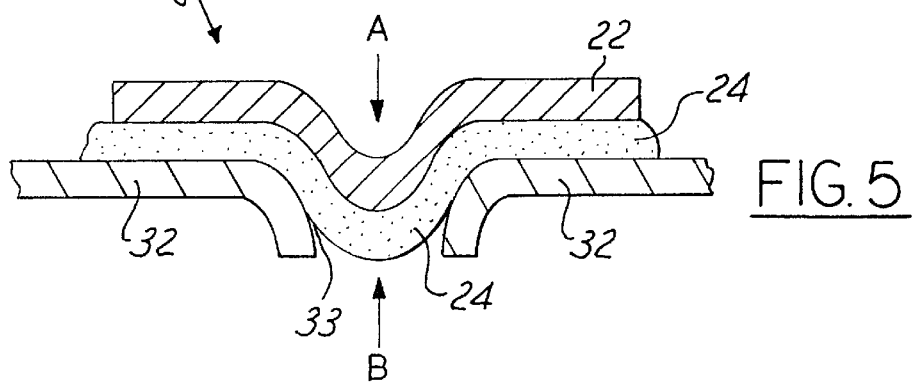
FIG. 5 illustrates in cross section the reinforced magnetic hot patch of FIG. 4 after expansion and melting of the adhesive.
Figure 9:
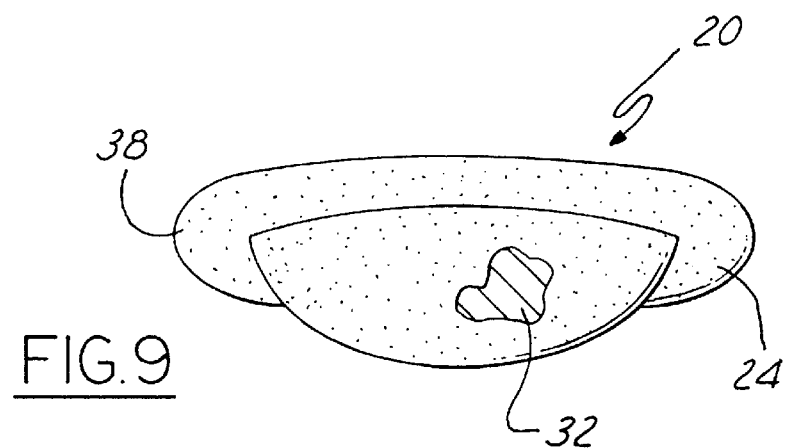
FIG. 9 is a perspective view of the article of FIG. 1, fragmented to expose the adhesive layer.

Referring again to FIGS. 1 and 3 of the drawings, laminated structure 30 is deformed in a metal shaping operation, most preferably using a progressive die. The shape of the finished assembly (FIG. 1) is non-planar and specifically mates with the opening to be sealed, as shown in FIG. 4. Accordingly, assembly 20 of the present invention has a non-planar geometry which conforms to the geometry of metal 32 surrounding opening 34. After adhesive 24 is heated it expands, flows and solidifies as shown in FIG. 5 to seal hole 34. Thus one preferred embodiment is the structure shown in FIGS. 4 and 5 in which a circular access hole 34 is plugged with assembly 20 in which the laminated structure 30 is formed to provide concave portion 36 and circular flange 38. Thus, in this embodiment, assembly 20 resembles an inverted hat-shaped structure. Also, it is to be understood that although cross-sections are shown in FIGS. 1–8, the magnetic hot melt patch articles are three-dimensional such as shown in FIG. 9. In another preferred configuration (FIG. 6) assembly 20' has a convex portion 40 and a rim 42. It will be understood that in the embodiments of FIGS. 5 and 6, respectively, flange 40 and rim 42 conform to the geometry of the metal surrounding lip 33. In this manner, the present invention maximizes surface contact between assembly 20 and the metal.

Once hot melt patch article 20 has been formed, the parts are stored for future use. One of the benefits of the present invention is the ease with which assembly 20 can be installed. Due to the strong magnetic field generated by adhesive layer 24 and the maximized surface area contact with the surfaces surrounding the opening, installation is carried out simply by aligning assembly 20 with opening 34 and placing it over the opening in contact with metal 32. Magnetized adhesive layer 24 then holds assembly 20 in place until the vehicle (or other structure) is heated to melt adhesive layer 24, whereupon it flows (as shown best in FIGS. 5 and 6) and bonds securely to metal 32. As stated, in the most preferred embodiment, adhesive layer 24 contains a cross-linking monomer which accelerates cross-linking.

Figure 6:
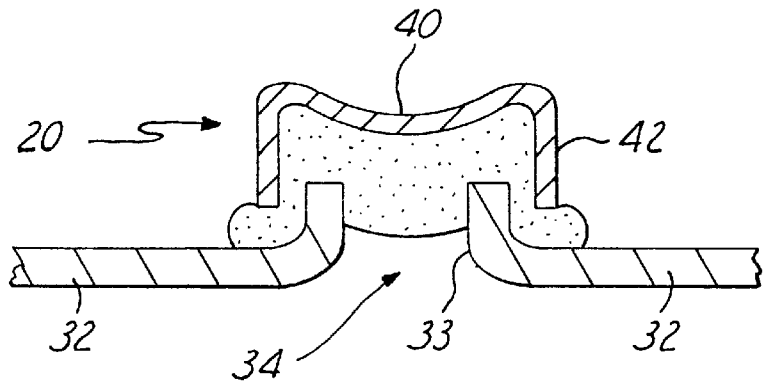
FIG. 6 is another expanded and melted reinforced magnetic hot patch in cross section in accordance with the present invention.

The installed and cured assembly 20 shown in FIGS. 5 and 6 has significantly higher bond strength over many prior art hot melt patches. Rigid backing 22 provides resistance to punch-through forces not only in the direction of arrow A (FIG. 5), but also in the direction of arrow B, which was a particularly unexpected result of the present invention. It is theorized that rigid backing 22 distributes forces more evenly through adhesive 24 to prevent cohesive and adhesive failures. Cured assembly 20 most preferably provides a minimum of 100 1b pushout force along arrow B for 250° F./25 minutes of bake time and 315° F./25 minutes of bake time. Also, cured assembly 20 should exhibit no significant corrosion under the assembly after 10 days of salt spray mist exposure for galvanized steel structures. That is, the metal backing is spaced from the underlying metal structure and the adhesive per se forms a water-tight bond that prevents corrosion.

Figure 7:
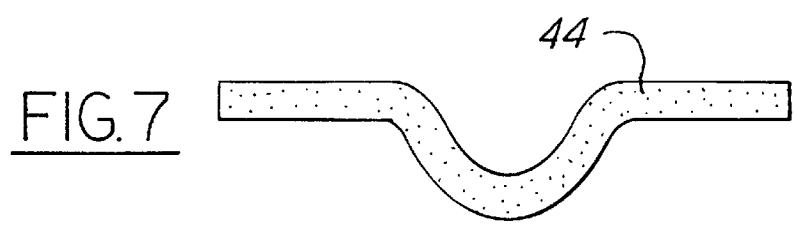
FIG. 7 is a cross-sectional view of a non-planar magnetic hot patch assembly made in accordance with the present invention.
Figure 8:
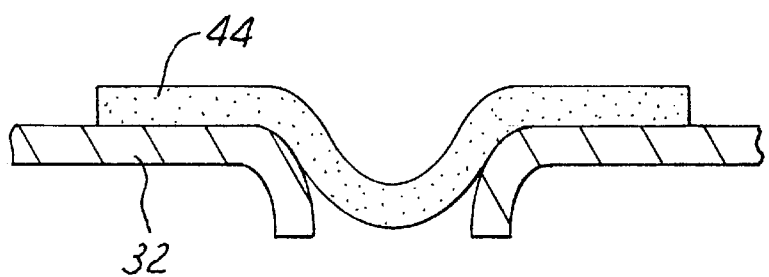
FIG. 8 is the non-planar magnetic hot patch of FIG. 7 after expansion and melting.

It is to be understood that it may be desirable to omit rigid backing 22 from assembly 20 in some applications, whereupon a forming operation other than metal forming may be used to obtain the non-planar structure of the present invention. For example, adhesive 24 may be formed by plastic injection molding. In this embodiment, magnetic hot melt adhesive is most preferably formed into a non-planar shape 44 as shown in FIG. 7 of the drawings. It is particularly important in this embodiment that the shape of patch 44 conforms to the metal surrounding the opening to be sealed. The same preferred formulations as set forth above are used to fabricate patch 44.

The method of the present invention includes the steps of determining the shape and area of an opening in a metal surface and the geometry of the surfaces which define the opening; forming a magnetic hot melt patch (with or without rigid backing 22) which mates with the surrounding surfaces for optimal surface area contact and which covers the opening entirely to form a complete and reliable seal; placing the magnetic hot melt patch in position on the mating metal surface; and melting and expanding the adhesive to seal the opening.

Thus, it is apparent that there has been provided in accordance with the invention a method and apparatus that fully satisfies the objects, aims and advantages set forth above. While the invention has been described in connection with specific embodiments thereof, it is evident that many alternatives, modifications, and variations will be apparent to those skilled in the art in light of the foregoing description. Accordingly, it is intended to embrace all such alternatives, modifications and variations that fall within the spirit and broad scope of the appended claims.

EXAMPLES

The following examples are provided to more clearly illustrate the present invention and are not intended to limit the true scope of the invention as recited in the appended claims.

Magnetic hot melt adhesives were prepared having the following formulations:

|  | (Approximate Weight %) | | | |
| --- | --- | --- | --- | --- |
|  | I | II | III | IV |
| Hoosier Hm-206 | 71 | 72 | 72 | 72 |
| Elvax 265 | 5 | 6.3 | 4.5 | 5.9 |
| Super Nevtac 99 | 5 | 6.3 | 6.3 | 4.9 |
| Lotryl 35BA40 | 8.5 | 7.2 | 8.5 | 8.5 |
| Lotryl 28MA175 | 7 | 6.3 | 6.9 | 6.8 |
| SR350 | .3 | 0.3 | 0.3 | 0.3 |
| Varox 231XL | .7 | 0.7 | 0.7 | 0.7 |
| Celogen OT | .4 | 0.5 | 0.4 | 0.4 |
| BIK OT | .3 | 0.4 | 0.3 | 0.3 |
| Sanitizer 711 | .1 | 0.0 | 0.0 | 0.0 |

The adhesives so formulated were used to form a magnetic hot melt adhesive with a metal backing assembly similar to that shown in FIG. 4 of the drawings. The assemblies were then bonded to a metal sheet having an opening, and a series of tests were performed.

1. When heated to 240° F. or 315° F. for 25 minutes, the adhesives expanded over 50%.

2. Formulations I–IV passed cold impact tests at a 240° F. cure and a 315° cure.

3. Percent cohesive failure to electrocoat: 100%.

4. Percent cohesive failure to galvanized steel: 100%.

5. Pushout force for application mock-up (240° F. cure): 100–124 lbs.

6. Pushout force for application mock-up (315° F. cure): 200–217 lbs.

What is claimed is:

1. An assembly for sealing an opening in a surface, comprising:
   a hot melt patch, said hot melt patch having a rigid reinforcing backing; and
   said hot melt patch further having a non-planar magnetic hot melt adhesive body, said non-planar magnetic hot melt adhesive body having magnetic particles dispersed therein;
   said non-planar magnetic hot melt adhesive body being bonded to said rigid reinforcing backing.

2. The invention recited in claim 1, wherein said opening has surrounding surfaces which are non-planar and wherein said non-planar magnetic hot melt adhesive body mates with said non-planar surfaces surrounding said opening.

3. The invention recited in claim 1, wherein said non-planar magnetic hot melt adhesive body includes a thermoplastic resin.

4. The invention recited in claim 1, wherein said non-planar magnetic hot melt adhesive body contains an elastomer, a tackifier, an acrylic resin and a curing agent.

5. The invention recited in claim 1, wherein said magnetic particles are selected from the group consisting of barium ferrite, strontium ferrite, and iron oxide.

6. The invention recited in claim 1, wherein said non-planar magnetic hot melt adhesive body further contains an additive selected from the group consisting of antioxidants, antiozonants, ultraviolet absorbers, antistatic agents, colorants, coupling agents, curing agents, flame retardants, blowing agents, heat stabilizers, impact modifiers, lubricants, plasticizers, preservatives, processing aids and stabilizers and combinations thereof.

7. The invention recited in claim 4, wherein said non-planar magnetic hot melt adhesive body further contains a multifunctional cross-linking monomer.

8. The invention recited in claim 1, wherein said non-planar magnetic hot melt adhesive body contains a blowing agent.

9. The invention recited in claim 1, wherein said rigid backing is metal.

10. The invention recited in claim 1, wherein said rigid backing is plastic.

11. A patch assembly, comprising:
    a magnetic hot patch having a rigid non-planar reinforcing backing;
    said magnetic hot patch further having a non-planar adhesive body bonded to said rigid non-planar reinforcing backing;
    said non-planar adhesive body containing a plurality of magnetized particles; and
    said non-planar adhesive backing further containing a blowing agent.

12. The invention recited in claim 11, wherein said adhesive body includes a thermoplastic resin.

13. The invention recited in claim 11, wherein said adhesive body contains an elastomer, a tackifier, an acrylic resin and a curing agent.

14. The invention recited in claim 11, wherein said magnetic particles are selected from the group consisting of barium ferrite, strontium ferrite, and iron oxide.

15. The invention recited in claim 11, wherein said magnetic hot melt adhesive further contains an additive selected from the group consisting of antioxidants, antiozonants, ultraviolet absorbers, antistatic agents, colorants, coupling agents, curing agents, flame retardants, blowing agents, heat stabilizers, impact modifiers, lubricants, plasticizers, preservatives, processing aids and stabilizers and combinations thereof.

16. The invention recited in claim 13, wherein said adhesive body further contains a multifunctional cross-linking monomer.

17. The invention recited in claim 11, wherein said rigid backing is metal.

18. The invention recited in claim 11, wherein said rigid backing is plastic.

19. A hot melt patch assembly for sealing an opening in a surface, comprising:

a rigid non-planar metal backing; and a non-planar magnetic hot melt adhesive body, said non-planar magnetic hot melt adhesive body including a plurality of magnetic particles, ethylene vinyl acetate copolymer, an acrylic resin, a tackifier, a blowing agent, a multifunctional cross-linking monomer and a peroxy cross-linking agent wherein said magnetic particles comprise from about 50 to about 85 percent by weight of said adhesive body, said ethylene vinyl acetate comprises from about 2 to about 20 percent by weight of said adhesive body, said acrylic resin comprises from about 10 to about 30 percent by weight of said adhesive body, said tackifier comprises from about 2.5 to about 10 percent by weight of said adhesive body, said blowing agent comprises from about 0.1 to about 1.0 percent by weight of said adhesive body, said multifunctional cross-linking monomer comprises from about 0.05 to about 0.5 percent by weight of said adhesive body and said peroxy cross-linking agent comprises from about 0.1 to about 1.5 percent by weight of said adhesive body.

20. A magnetic hot melt adhesive patch, comprising:

a main body portion;

said main body portion being formed of a hydrocarbon resin;

said hydrocarbon resin containing a plurality of magnetic particles; and a flange portion extending from said main body portion, said flange and said main body portion being shaped to be received by an opening and a metal surface surrounding said opening.

21. An assembly for sealing an opening in a surface, comprising:

a hot melt patch, said hot melt patch having a rigid reinforcing backing; and said hot melt patch further having a non-planar magnetic hot melt adhesive body, said non-planar magnetic hot melt adhesive body having magnetic particles dispersed therein;

said non-planar magnetic hot melt adhesive body being bonded to said rigid reinforcing baking and said reinforcing backing generally retaining its shape after said hot melt adhesive body has been cured by exposure to heat.

* * * * *